Aug. 1, 1961  W. A. SCISM ET AL  2,994,865
FREQUENCY AND DRIFT ANGLE TRACKER
Filed Sept. 23, 1957  6 Sheets-Sheet 1

*INVENTOR.*
WILLIAM A. SCISM
WILBUR J. HUNTINGTON, JR.
WILLIAM B. LURIE
JULIUS STERNFELD
BY
*H. L. Mackey*
ATTORNEY.

Aug. 1, 1961  W. A. SCISM ET AL  2,994,865
FREQUENCY AND DRIFT ANGLE TRACKER
Filed Sept. 23, 1957  6 Sheets-Sheet 2

INVENTOR.
WILLIAM A. SCISM
WILBUR J. HUNTINGTON, JR.
WILLIAM B. LURIE
BY JULIUS STERNFELD

ATTORNEY

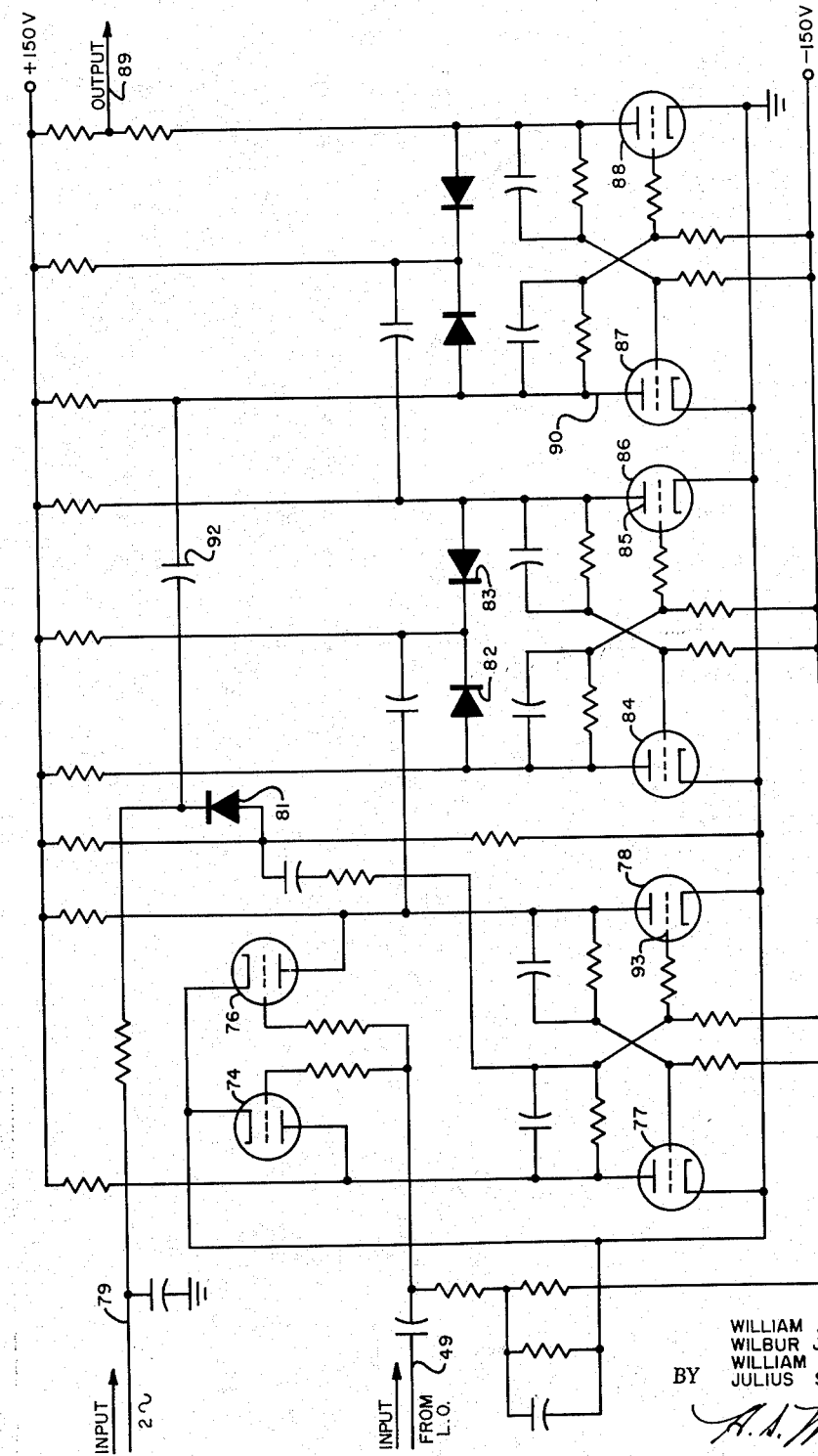

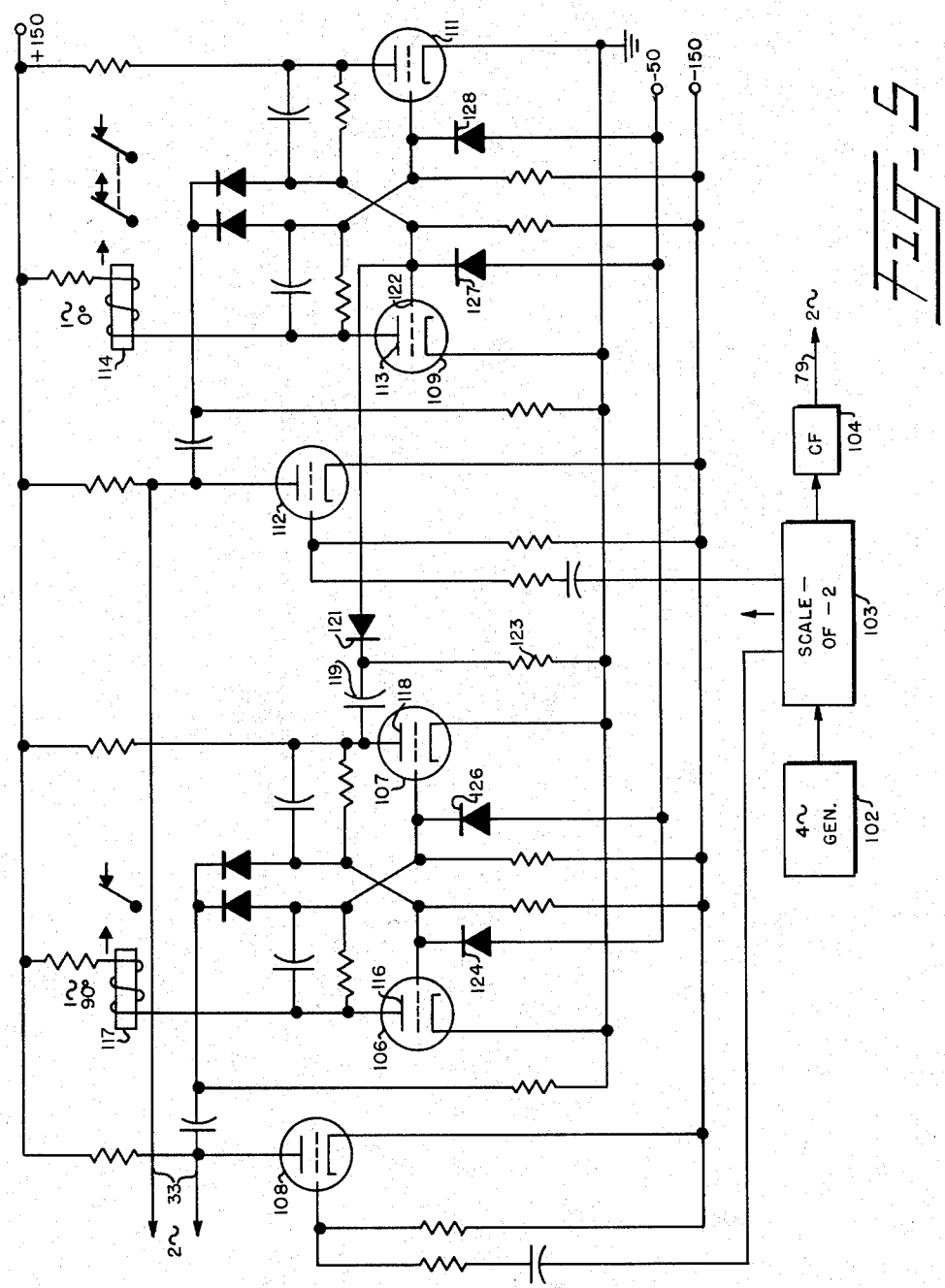

Aug. 1, 1961  W. A. SCISM ET AL  2,994,865
FREQUENCY AND DRIFT ANGLE TRACKER
Filed Sept. 23, 1957  6 Sheets-Sheet 5

INVENTOR.
WILLIAM A. SCISM
WILBUR J. HUNTINGTON, JR.
BY WILLIAM B. LURIE
JULIUS STERNFELD
ATTORNEY.

United States Patent Office 2,994,865
Patented Aug. 1, 1961

2,994,865
FREQUENCY AND DRIFT ANGLE TRACKER
William A. Scism, Brewster, N.Y., Wilbur J. Huntington, Jr., Nashua, N.H., and William B. Lurie, New Rochelle, and Julius Sternfeld, Tarrytown, N.Y., assignors to General Precision Inc., a corporation of Delaware
Filed Sept. 23, 1957, Ser. No. 686,808
9 Claims. (Cl. 343—9)

This invention relates to frequency and drift angle tracking circuits, and particularly to tracking circuits adapted to be used in avionic Doppler navigational apparatus.

Aircraft Doppler microwave devices employ radiated beams pointed at or near the aircraft ground track, and measure the Doppler frequency component of the microwave echo. It is conventional for such devices to follow changes in the Doppler frequency automatically, the particular electrical circuit component for so doing being termed a frequency tracker. Frequently such apparatus also includes an arrangement for automatically maintaining the radio beams pointed in the general direction of the ground track. Since the instrumentation for thus automatically aiming the beams also may be made to provide a continuous indication of the drift angle between the ground track and the aircraft heading, such a device may be termed a drift angle tracker.

Frequency trackers of the discriminator type filter the Doppler frequency information to reduce or remove noise, find the center frequency of the Doppler spectrum, and follow or track any changes thereof. In accomplishing these functions the Doppler frequency is first transformed by the heterodyne method to another fixed frequency, at which the filtering is to be accomplished. When the latter frequency is zero the tracker is termed a zero frequency tracker. The frequency tracker portion of the instrument of this invention is of this type, which is generally described in patent application Serial No. 371,608, filed July 31, 1953, now Patent No. 2,896,074.

Such a frequency tracker contains a negative feedback loop containing an error signal which represents the amount and sense of the output signal error relative to the input Doppler signal frequency. In order to sense the sign of the error a dual element must be provided. In the instant invention the dual element is the modulating frequency generator which generates two distinct modulating frequencies in alternation. This sensing method and means as well as the receiver-transmitter portion of the system are generally described in patent application Serial No. 588,908, filed July 1, 1956, now Patent No. 2,915,748.

In the present invention the two time-shared modulating frequencies have a constant ratio although their absolute values may continuously change in the process of loop balance adjustment. They are developed by counting down or dividing the output of a square wave generator, employing scale-of-two multivibrators. The emitted output thus suffers no hiatus and generates no transients at this point when its frequency changes.

Operation of the drift angle tracker of this invention depends on employing two or more beams or lobes of microwave radiation which, when properly directed, accurately straddle the ground track. These straddling beams are not simultaneously emitted, but are radiated alternately. The rate of alternation is made to be different from the frequency tracker modulation time-sharing rate so that signals having the two rates can be separated and separately utilized in the combined frequency and drift angle tracker. It has been found highly advantageous to make the frequency tracker frequency modulation time-sharing rate and the drift angle tracker beam alternation rate have the ratio of two to one. The selection of this ratio, and beam rate phase detection at quadrature phase shift, combine to render the apparatus impervious to unbalances in antenna gains. This combination also renders the drift angle tracker insensitive to frequency tracker loop balance errors and renders the frequency tracker insensitive to drift angle loop balance errors.

The instant frequency tracker consists of a balanced modulator, the Doppler error signal output of which is filtered in a low-pass filter, then is phase-detected at the modulating frequency change rate which is within the transmission band of the preceding low-pass filter, and is selected for the purpose of example as two cycles per second. The output is integrated and applied to control an oscillator which has a frequency of output higher than the Doppler frequency and which is adjustable over a percentage range not less than the expected Doppler frequency range. In the example to be described the oscillator output frequency is maintained at a value about 15 times that of the Doppler frequency being tracked. The oscillator output is transmitted through a count-down circuit which generates two lower frequencies, one just above the Doppler frequency and one just below. The nature of the count-down circuit is such that the ratio of the two output frequencies is rigidly constant. The two count-down output frequencies are not usually generated simultaneously, but in alternation at the modulating frequency change rate, for example, 2 c.p.s. Each frequency is therefore generated for a time of one-quarter second. These two output frequency signals are applied in alternation to the modulator, the average of their frequencies being, at loop null, equal to the Doppler frequency. Any change of the Doppler frequency generates an error signal which readjusts the oscillator frequency and the two dependent count-down frequencies, reestablishing the loop null.

The drift angle tracker loop includes the Doppler radio time-shared antenna, two or more beams thereof, and a transmitter-receiver emitting a signal having Doppler frequency and also having the antenna time-sharing frequency or alternation rate. This rate is selected in this example as one cycle per second, that is to say, one beam illuminates the earth at one side of the ground track for one-half second, then the other beam illuminates the earth on the other side of the ground track for the next one-half second. The antenna is horizontally rotatable by a motor and at the null of the drift angle loop servomechanism the beams strike the earth equally distant from the ground track. The Doppler components of the return signals, echo signal bandwidths and amplitudes are then all equal. When, however, one beam is closer to the ground track than the other, its Doppler frequency is higher, its echo bandwidth may be narrower and its echo amplitude may be greater. This gives rise to a one c.p.s. signal in the frequency tracker loop which is isolated and quadrature phase detected to form an error signal. This signal is applied to the motor which rotates the antenna in such a way as to cause the radio beams to straddle the ground track exactly, causing the error signal to disappear.

The principal purpose of this invention is to provide an avionic navigational Doppler tracker having interdependent frequency and drift angle loops, the frequency loop employing dual zero frequency modulation and the time-sharing antenna switching rate being one-half the dual modulation switching rate.

Another purpose of this invention is to provide such a tracker having a rigidly maintained ratio between the dual modulating frequencies.

Still another purpose of this invention is to provide a tracker having drift angle loop demodulation at the same rate as the antenna switching rate but in quadrature phase thereto, whereby the drift angle output is independent of antenna gain differences and of frequency tracker loop unbalance, and whereby the frequency tracker output is independent of drift angle tracker loop unbalance.

A further understanding of this invention may be secured from the following detailed description and associated drawings, in which:

FIGURE 3 is a schematic diagram of the scale of 7 and 8 count-down portion of the system of the invention.

FIGURE 5 is a schematic diagram of the 2-cycle and 1-cycle generator.

FIGURES 6, 7, 8 and 9 contain graphs and curves explaining the operation of the drift angle tracker portion of the system.

Figure 1:
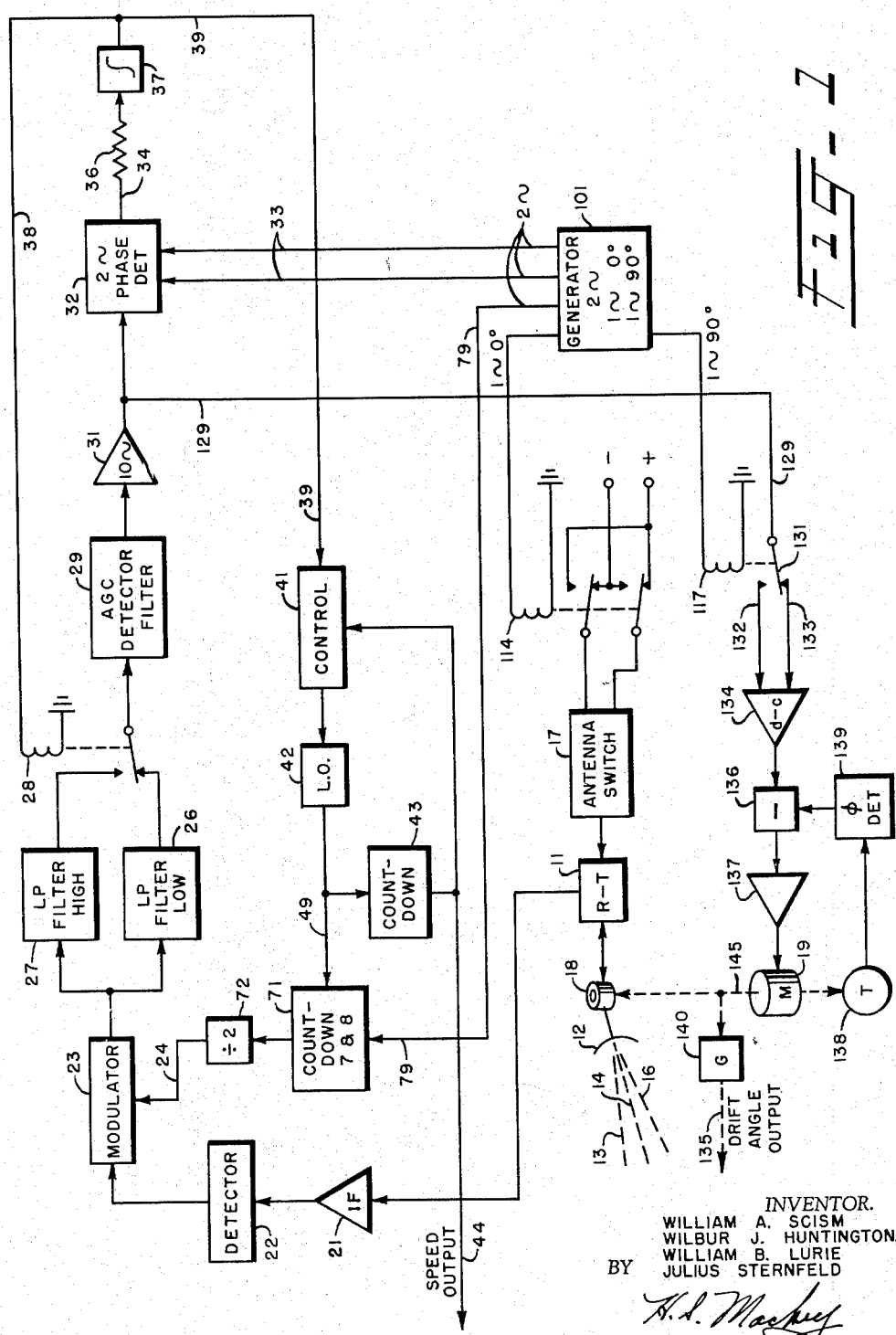
FIGURE 1 is a schematic diagram of an embodiment of the invention.

Referring now to FIG. 1, an aircraft navigation receiver-transmitter 11 supplies microwave pulses to an antenna 12. This antenna emits at least three beams 13, 14, and 16 and receives the echoes thereof reflected obliquely from the earth's surface. The receiver derives from these echo signals an intermediate frequency signal containing Doppler information representative of the aircraft ground track speed. At least two of the three antenna beams 13, 14 and 16 normally straddle the ground track and are emitted in alternation at an alternating rate of one c.p.s. An antenna switch 17 schematically represents arrangements contained within the receiver-transmitter which act to produce such alternate beams. The antenna is movable in azimuth about a bearing 18 by a motor 19. At least three beams are used so that Janus techniques for the recovery of Doppler information may be utilized. That is, the information in beams of energy received from areas located fore and aft of the craft is generally used for ascertaining information as to speed of craft while the information in beams of energy located on opposite sides of the craft yields information relative to drift as is more fully set forth in Patent No. 2,915,748 supra. For an understanding of the principles of the present invention only two of the beams may be considered.

The intermediate frequency signal output of receiver-transmitter 11 is amplified in amplifier 21, and is demodulated in detector 22 to produce a signal containing the frequency spectrum of the Doppler information. This spectrum is applied to the first element of the frequency tracker looper consisting of a balanced modulator 23. This modulator is supplied through conductor 24 with two modulating signals, one having a frequency above the center of the Doppler frequency spectrum and the other below. These two modulating signals are applied in regular alternation, each being applied for one-quarter second, the frequency of alternation thus being two c.p.s. The modulated sum and difference outputs are applied to one of two low-pass filters 26 and 27. In the lower part of the speed range of the aircraft the "low" filter 26 is employed having, for example, a pass band from substantially zero to 100 cps. In the higher speed range the other filter 27 is utilized and this filter may have a pass band from zero to 500 cps. Filter selection is accomplished by a relay 28. These filters eliminate the sum modulations and also eliminate some noise. This latter function is important and partly explains the use of two filters to narrow the emitted spectrum to the greatest possible extent.

In further explanation of the desirability of varying the filter bandwidth, it has been found that at high aircraft speeds, employing a selected filter, the frequency tracker loop accuracy is excellent. As the speed is reduced, at a certain speed the loop accuracy sudenly begins to lessen and this effect rapidly increases as the speed is further reduced. The speed at which accuracy beings to deteriorate is a function of bandwidth, the narrower the bandwidth the lower the speed at which deterioration begins. However, at higher speeds narrow band filters do not pass enough energy for best operation, so that for every aircraft speed there is an optimum width of filter transmission band. It therefore is advantageous to adjust the filter bandwidth in accordance with the aircraft speed. The adjustment may be rough or precise. For example, the filter may be adjustable in one step as described, or in a number of steps or continuously proportional to speed, and may be adjusted either manually or automatically.

The filtered output includes the modulated difference frequency signals. If the frequency tracker loop is not perfectly nulled the filter output includes a two c.p.s. component and if the drift angle tracker loop is not perfectly nulled the filtered output additionally includes a one c.p.s. component. This combined signal is gain controlled in an AGC circuit 29 having a 4-second time constant so as not to disturb the lowest, one c.p.s., frequency if present, is then detected and is filtered to remove the difference modulation. The remainder of the signal, which may include one c.p.s. and two c.p.s. frequencies, is amplified in an amplifier 31 having a pass band of from zero to 10 c.p.s. The signal is then phase detected at the two c.p.s. rate in a detector 32 having a phasing reference input applied thereto through conductors 33. The direct current output applied to conductor 34 represents in amplitude and sense the amplitude and sense of any two c.p.s. error component introduced to the phase detector and is coupled through a resistor 36 to an integrator 37. The integrated output is a direct potential representing in magnitude the Doppler frequency. This potential is applied through conductor 38 to the marginal relay 28, operating it at a predetermined amplitude representing an intermediate aircraft speed at which it is desired to change from one filter to the other.

The integrated output signal is also applied through conductor 39 and control circuit 41 to control the output frequency of a local oscillator 42. This oscillator is designed to have, when the loop is perfectly nulled, an output frequency $$\frac{14 \times 16}{15}$$

times the Doppler spectrum center frequency. The oscillator 42 also has a range of adjustment no smaller than the Doppler range in percent, and is linear and stable over that range. A negative feedback loop to enhance linearity is highly desirable. Such a loop is here composed of a count-down circuit 43 and the control circuit 41. The count-down circuit preferably is composed of several scale-of-two bistable multivibrator circuits connected in tandem. In this example the circuit consists of five such multivibrators, dividing the local oscillator output frequency by 32. This signal is also impressed on conductor 44 as the frequency tracker output signal having a frequency representing the aircraft ground speed.

Figure 2:
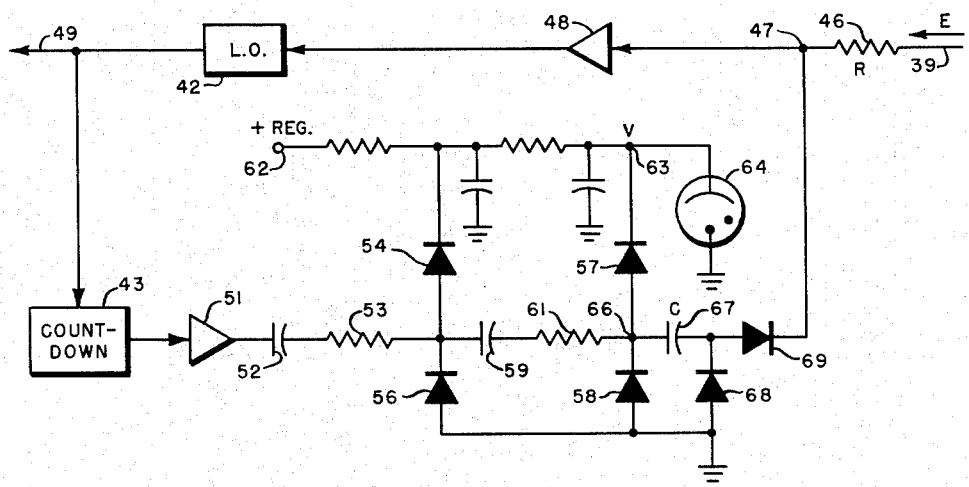
FIGURE 2 is a schematic diagram of the local oscillator control circuit used in the invention.

The control circuit 41 is schematically shown in FIG. 2. The integrator direct potential E proportional to ground speed is applied through conductor 39 and a resistor 46 having resistance R to junction 47 and to a high gain amplifier 48. The output of the amplifier 48 is applied to local oscillator 42, whose output at conductor 49 has at balance a frequency equalling the Doppler frequency multiplied by the factor $$\frac{14 \times 16}{15}$$

The oscillator output frequency is counted down in count-down circuit 43, the frequency of its output being one-thirty-second of the oscillator output frequency. The counted-down output is amplified in an amplifier 51 and is coupled through a capacity 52 and a resistor 53 to a two-stage limiter comprising diodes 54, 56, 57 and 58, capacitor 59 and resistor 61. The limiter is energized from a potential supply represented by terminal 62, the supply being further regulated to an approximately exact peak-to-peak voltage V at terminal 63 by the use of a voltage regulating tube 64. For greater accuracy, of course, in place of employing tube 64 the terminal 63 may be supplied from the same voltage source supplying the input signal E, any irregularities in the voltage of the source of supply then cancelling themselves.

The alternating potential at junction 66 is applied to a frequency measuring device comprising capacitor 67 having capacitance C and diodes 68 and 69. This device at balance, in combination with other loop components, proportions the frequency $f$ applied to capacitor 67 to potential E in accordance with the proportionality $$E \approx VfRC$$

A frequency measuring device of this type is described in Patent No. 2,584,866. At balance the potential of junction 47 is near a datum level which is approximately that of ground. Any departure from the datum level applies a small voltage to the high gain amplifier 48 which applies an amplified direct voltage to the oscillator 42 so as to maintain or bring its output to the balance frequency.

The alternating output of local oscillator 42, FIG. 1, is counted down, or its frequency is divided by the integers 14 and 16, in alternation at a two c.p.s. rate and the counted-down output is applied as dual time-shared modulation to the modulator 23. The frequency division is done in two steps, first a 7 and 8 count-down unit 71 reduces the frequency alternately to $\frac{1}{7}$ or $\frac{1}{8}$ of the oscillator frequency, then the frequency is further divided by two in a single scale-of-two circuit 72, resulting in symmetrical rectangular output waveforms at the $\frac{1}{14}$ count-down ratio as well as at the $\frac{1}{16}$ ratio.

The circuit for counting down by 7 and 8 is schematically shown in FIG. 3. The input on conductor 49 derived from the local oscillator 42, FIG. 1, at a frequency, of say, 200 kc. p.s., is applied as a series of positive 15-volt pulses to a pair of triodes 74 and 76, FIG. 3, overcoming a high negative grid bias and causing both tubes to become highly conductive for the duration of each pulse and thus producing negative pulses at their anodes. The anodes of tubes 74 and 76 are connected to the anodes of a pair of multivibrator triodes 77 and 78, one of which is conductive while the other is nonconductive, so that these negative anode pulses, passing to the opposite multivibrator grids, cause the conductive multivibrator tube to become non-conductive, and the non-conductive tubes to become conductive.

An input conductor 79 applies a 2 c.p.s. square wave potential to the cathode of diode 81. This potential alternates between +125 volts and +175 volts. The anode of diode 81 is held at approximately +150 volts, so that the diode 81 is rendered alternately conductive and nonconductive by the 2 c.p.s. voltage. This diode 81 controls the selection of a count-down divisor of 7 or 8. When the 2~ input is +175 volts the diode 81 is nonconductive and the count-down circuit counts 8. When the potential applied to the right side of the diode is +125 volts the diode is conductive and the count-down ratio is 7 to 1.

Let it be assumed that the 2~ input is in the 175 volt half of its cycle, making diode 81 non-conductive so that the input frequency is divided by eight. As the anode potential of triode 78 rises and falls it applies pulses to diodes 82 and 83. Only negative pulses can pass these diodes and such pulses occur once each cycle of stage 1. These pulses advance stage 2, comprising triodes 84 and 86, by one-half cycle increments. Similarly in each cycle of stage 2 one negative pulse is emitted by anode 85 which advances stage 3, comprising triodes 87 and 88, by one-half cycle. Thus the frequency of stage 1 is one-half the input pulse frequency, that of stage 2 is one-quarter, and that of stage 3 is one-eighth. Output is taken from the anode resistor tap 89 of stage 3.

Figure 4:
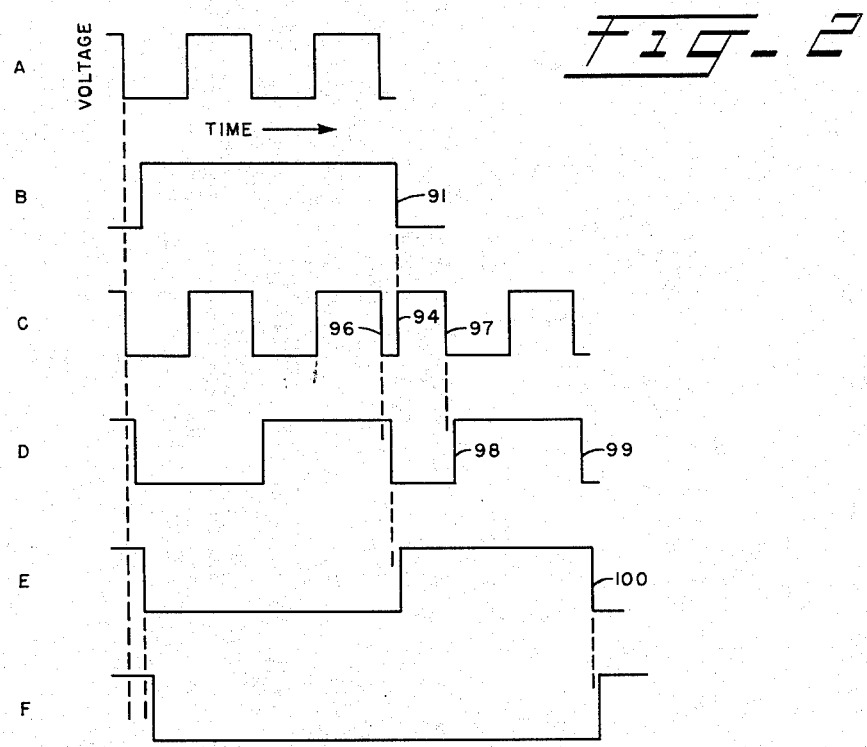
FIGURE 4 depicts graphs explaining operation of the circuit of FIG. 3.

The circuit divides by seven during those half-cycles of the 2 c.p.s. input when +125 volts is applied to the cathode of diode 81, making it conductive. Assuming this condition, graph A, FIG. 4 depicts the anode voltage of triode 78 and graph B that of the triode 87 at conductor 90. This voltage of graph B lags the graph A voltage slightly because of tube and circuit time delays. In the third stage at time 91, graph B, the down-going voltage is transmitted as a pulse through capacitor 92 and diode 81 to the grid 93 of the tube 78, causing the tube 78 to become non-conductive and its anode potential to rise. The first stage output voltage graph A is repeated in graph C with this rise 94 added. It occurs only a few microseconds after the fall 96 at the start of the aborted half cycle. Upon receipt of the next input pulse from conductor 49 the anode of triode 78 again falls at time 97, graph C, causing a change 98, graph D, in the anode 85 of tube 86 of the second stage. Upon its fall at time 99, graph D, it causes a fall in anode voltage of triode 88 as indicated in graph E at time 100, making that half cycle of the third stage only ¾ of the time period of the other half cycle. Thus the full cycle of the third stage is only ⅞ of its normal period when diode 81 is non-conductive. The asymmetry of the output is eliminated in the following scale-of-two circuit 72, FIG. 1, one-half cycle of which is shown in graph F, FIG. 4.

The 2 c.p.s. square wave applied to the count-down circuit 71, FIG. 1, through conductor 79 is generated in a generator 101. This generator also generates two 1 c.p.s. square wave voltages in quadrature phase for use in the drift angle tracker. The schematic circuit of this generator, FIG. 5, includes a free-running multivibrator 102 operating at 4 c.p.s. Its output actuates a scale-of-two circuit 103 having an output frequency of 2 c.p.s. Output from one anode is used, through a cathode follower 104, to control the 7 and 8 count-down circuit 71, FIG. 1. Another output from the same anode and an output from the other anode of the scale-of-two circuit 103, FIG. 5 are used to actuate two one c.p.s. generators. These generators are at quarter phase since their triggering inputs from the two c.p.s. circuits are at opposite phases.

These generators comprise two scale-of-two multivibrators, one comprising multivibrator triodes 106 and 107 and trigger triode 108, and the other comprising multivibrator triodes 109 and 111 and a trigger triode 112. The output of this latter multivibrator is taken from anode 113 and used to operate a relay 114 in what is defined as zero phase. The output of the multivibrator comprising triodes 106 and 107 from anode 116 is used to operate a relay 117. Its phase of operation is in quadrature with the operation of relay 114, and is forced to be in a selected sense, lagging as drawn, by means of a phasing interconnection between the two scale-of-two multivibrators.

The phasing interconnection consists of the path from anode 118 through capacitor 119 and diode 121 to grid 122 of triode 109. In the operation of this phasing interconnection, when the potential of anode 118 drops suddenly, as it does once each cycle, the voltage drop is differentiated in capacitor 119 and resistor 123 and the resulting negative spike is transmitted through diode 121 to grid 122. If the multivibrator comprising triodes 109 and 111 should be in that half cycle when tube 109 is non-conductive, this spike has no effect, but if the multivibrator should be in the other half cycle of its operation tube 109 is changed by the negative spike from conductive to non-conductive condition, immediately forcing tube 111 to conduct. Thus the phase of this multivibrator is forced to take and maintain a selected sense relation to the phase of the multivibrator comprising triodes 106 and 107.

Diodes 124, 126, 127 and 128 prevent their respective grids from becoming more than 50 volts more negative than their cathodes, protecting the tubes from injury.

The relay 114, FIGS. 1 and 5, is an adjunct of the antenna switch 17, controlling its operation at one c.p.s., 0° phase, and thereby causing at least two of the emitted microwave beams to irradiate the ground in alternation, one beam striking the ground on one side of the ground track and the other on the other side.

The drift angle tracker loop includes the receiver-transmitter 11, FIG. 1, antenna 12, as stated, and all components including motor 19 associated with the straddle beaming of the microwave energy. In the drift angle loop, the receiver output is amplified in amplifier 21 and detected in detector 22. The resulting video frequency signal containing Doppler information in general also contains a one c.p.s. component because of differences in gain and/or azimuth positioning of the antenna components associated with the straddle beams. The signal is modulated in modulator 23 where, in general, a two c.p.s. component is added as before described. After filtering in one of the filters 26 or 27 the signal is gain-controlled, detected and filtered to remove the Doppler error frequencies, effectively leaving only one c.p.s. and two c.p.s. frequency components. These frequency components are amplified in zero-to-ten cycle amplifier 31, from which the signal is applied through conductor 129 to the armature 131 of relay 117. This relay operates as a one c.p.s. demodulator, so that direct current flow through contacts 132 and 133 into the differential input of a direct-current amplifier 134. This amplifier applies its output signal through a subtracting circuit 136 and power amplifier 137 to motor 19. The amplitude of the signal applied to the motor is proportional to the difference of the signals on contacts 132 and 133 and the sense of the signal and of the motor rotation depends on which of these signals is the larger.

Motor operation is stabilized by use of a tachometer 138, the output of which is phase detected in phase detector 139 and fed subtractively to the input of the power amplifier 137.

The drift angle loop output is taken from the angular displacement of the motor shaft. This displacement may be indicated or otherwise utilized at a shaft 135 which is connected through a speed reduction gear 140 to the motor shaft 145. The drift angle tracker operation ignores differences in antenna gain but is sensitive to differences in the distances of the right and left antenna lobe illuminated ground areas from the ground track. This advantageous operation is due to the use of one-c.p.s. power on relay 117 which is phase-shifted 90° relative to the one-c.p.s. power applied to relay 114.

Figure 6:
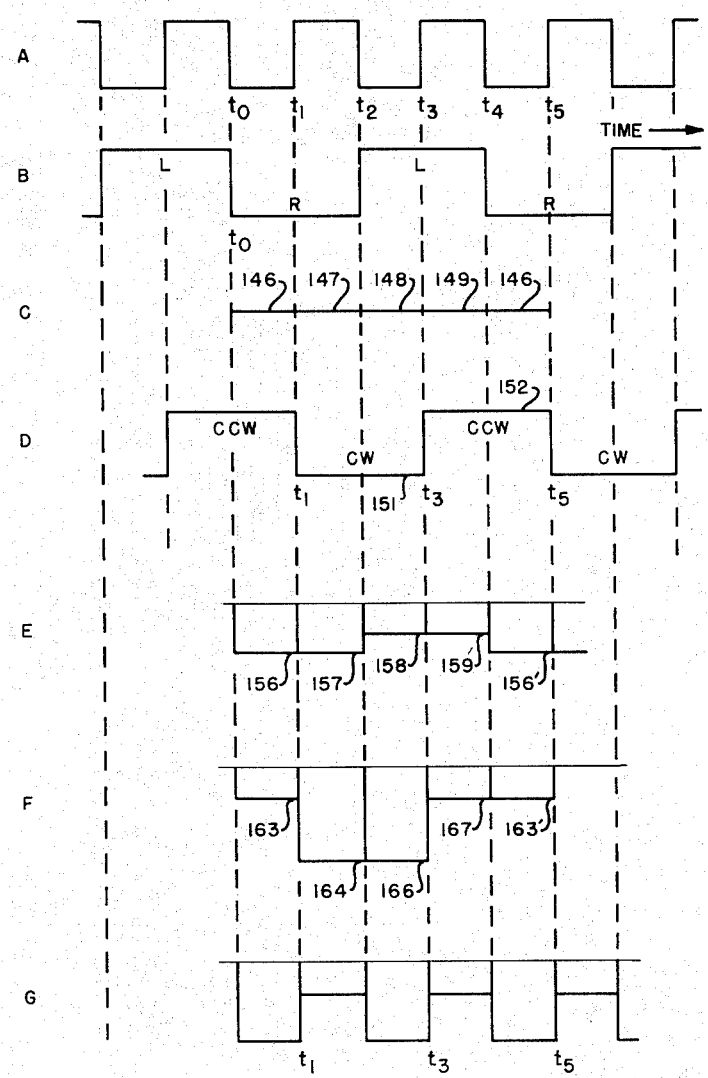
Figure 7:
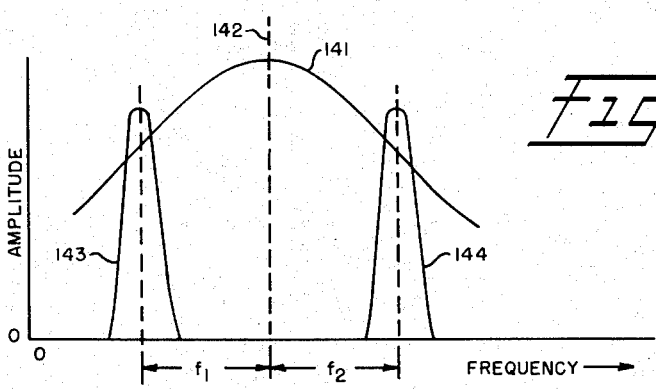

The time graph of the rectangular waveform at two c.p.s. applied to the frequency tracker loop is depicted as graph A, FIG. 6, with zero phase at time $t_0$. When this loop is exactly nulled the frequency relations in modulator 23 are depicted in FIG. 7. The Doppler spectrum 141 with center frequency 142 is exactly straddled by the two modulating inputs, counted down from the oscillator frequency by 16 and 14, depicted by forms 143 and 144 respectively. Illuminations of the ground by the right and left antenna lobes occurring in alternation at one c.p.s. are indicated by the graph B, FIG. 6, which represents the square voltage wave applied to the lobing relay 114, FIG. 1, with resulting right and left microwave lobe radiations either of reception or transmission occurring during the times indicated by the letters R and L. Zero phase is defined as the phase at time $t_0$, FIG. 6B.

Let it be assumed, in addition to the frequency tracker loop being nulled, that the drift angle loop is exactly nulled, that is, that the right and left antenna lobes are equidistant from the ground track. Let it further be assumed that the gains of the two antennas generating these lobes and receiving their echoes are exactly equal, including the gains and losses of all components associated in applying the lobe signals to the intermediate frequency amplifier. Then in the output of the amplifier 31, FIG. 1, during the time $t_0$—$t_1$ of the first half cycle of the two-cycle modulation a selected voltage level 146, FIG. 6C, will be observed. This voltage represents the frequency difference $f_1$ between the center Doppler frequency 142, FIG. 7, and the modulating frequency 143. During the next interval $t_1$—$t_2$, FIG. 6A, the level 147, graph C, is the same as level 146 because the frequency difference $f_2$, FIG. 7, between the modulating frequency 144 and the Doppler center frequency 142 is the same as $f_1$. During the third interval $t_2$—$t_3$, graph A, the echo signal is from the left lobe illumination, but since it is the same in both frequency and amplitude as the R signal the output from amplifier 31, FIG. 1, remains at the same level. This is represented by the line 148, graph C. Similarly during the fourth half cycle, $t_3$—$t_4$, the same level is represented by line 149.

The one-c.p.s. quadrature voltage applied to relay 117, FIG. 1, is represented by graph D, FIG. 6. During time $t_1$—$t_3$ the armature 131, FIG. 1, dwells on contact 132 and motor 19 is rotated clockwise. This half cycle of the one c.p.s. 90° voltage is indicated by line 151 of graph D. During time $t_3$—$t_5$ the voltage is designated by line 152, armature 131 dwells on contact 133 and the motor 19 is rotated counterclockwise. However, the signals applied to armature 131 are all equal in amplitude and at low or zero level as shown by graph C, so that the motor effectively does not rotate.

Figure 8:
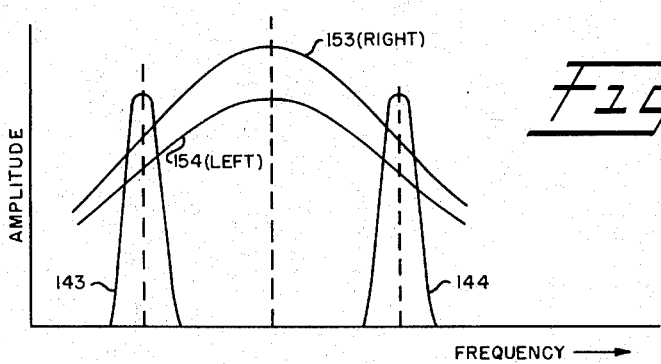

Now assume the same conditions except that the right and left lobe antenna gains are unequal, the right lobe gain being greater. The signals in modulator 23, FIG. 1, are depicted in FIG. 8, the modulating signals 143 and 144 being as in FIG. 7. The Doppler spectrum 153 from the right antenna lobe has greater amplitude than the spectrum 154 from the left lobe. Negative direct potential from amplifier 31, FIG. 1 during time $t_0$—$t_1$ now has a certain value represented by the line 156, graph E, representing the product of modulation 143 and spectrum 153. During time $t_1$—$t_2$ the output is represented by level 157, the same as 156, being the product of modulation 144 and spectrum 153. During time $t_2$—$t_3$ the product of modulation 143 and spectrum 154 is less and is represented by level 158. Level 159 is the same, being the product of modulation 144 and spectrum 154. It is evident that, since armature 131 dwells on contact 132 for time $t_1$ to $t_3$, it applies levels 157 and 158 to that contact having an averaged effect. During the time $t_3$—$t_5$ the levels 159 and 156' are applied to contact 133, having the same averaged effect. Therefore the net effect on the motor is zero. Thus differences in antenna gains have no effect on the azimuth servomotor 19.

Now assume that the frequency tracker loop is nulled and that the antenna gains are equal, but that the drift angle tracker loop is not nulled. One antenna lobe, say the right one, will then point more nearly to the ground track and the other lobe will be further away. The signal from the right lobe will then have higher frequency, greater amplitude and narrower spectrum bandwidth than the signal from the left lobe. However, for simplicity and because the effect of amplitude difference has already been explained, let it be assumed that the signal from the right lobe has higher frequency, but that it has the same amplitude and similar bandwidth as the left lobe signal. The modulator 23 signals are then represented by the curves of FIG. 9, it being assumed that the two-c.p.s. modulating signals 143 and 144 are equidistant from the average of the two antenna signals 161 (right) and 162 (left).

It will now be shown that the frequency differences result in a motor signal causing rotation. During time $t_0$—$t_1$, curve F, FIG. 6, a low signal level 163 is generated by the interaction of signals 143 and 161, indicated by the fact that in the graph their common area is small. But during time $t_1$—$t_2$ the interaction of signals 144 and 161 generates a much stronger signal represented by level 164, curve F. During time $t_2$—$t_3$ the interaction of signals 143 and 162 produces the level 166, and during time $t_3$—$t_4$ the interaction of signals 144 and 162 produces the level 167. Level 163 is then repeated as 163'; etc. Obviously during the dwell of armature 131 on contact 132, during time $t_1$—$t_3$, the signal level 164/166 is high and the motor is strongly rotated clockwise, but during time $t_3$—$t_5$ the levels 167/163' are low and the counterclockwise rotational force is small. Therefore the net effect of the signals applied to motor 19 is to cause clockwise rotation. This rotation is made to be in such direction as to make the antenna lobes equidistant from the ground track, erasing the azimuth error signal and restoring the condition of graph C.

Figure 9:
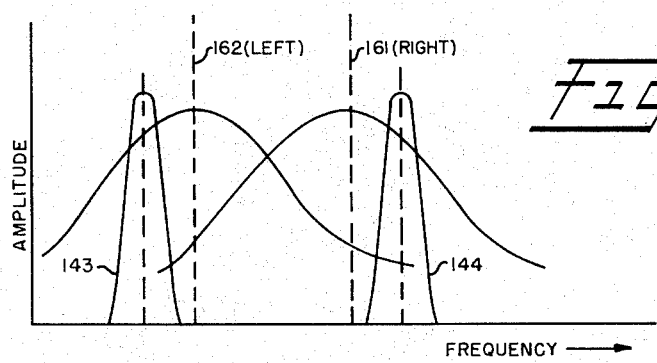

When both frequency and amplitude differences exist in the antenna lobe returns, a combination of the effects depicted in FIGS. 8 and 9 will exist, and will result in a combination of the graphs E and F, FIG. 6. This will result generally in four different signal amplitudes in the four consecutive time periods. However, in combination these signals as applied to motor 19 have effects no different from their separate effects as just described, and the servomechanism is made to operate so that the antenna lobes are equidistant from the ground track.

If graphs F and A be compared, it is evident that drift angle loop unbalance will have no net effect on the two c.p.s. phase detector output if this output be averaged over several cycles.

Let it now be assumed that the frequency tracker loop is unbalanced but that the antenna gains are equal and the drift angle loop is balanced. The two c.p.s. frequency tracker phase detector 32 will have an input represented by graph G. It is obvious that this signal for the period $t_1$—$t_3$ has an average equal to that for the period $t_3$—$t_5$ and therefore will have net zero effect on amplifier 134. That is to say, frequency tracker unbalance has no effect on the drift angle loop.

What is claimed is:

1. A frequency and drift angle tracker for a Doppler system wherein a plurality of energy beams are directed toward a target and speed and drift information is derived from the reflected echo signals comprising, means for directing a plurality of directionally spaced beams toward said target, means for receiving echo signals therefrom, means for alternately producing a pair of modulating signals having frequencies differing by a selected ratio at a first selected rate of alternation, means for modulating said echo signals by said alternately produced modulation signals to produce a pair of difference frequency signals, means for controlling the frequencies of said modulation signals by the time average of said difference frequency signals, means coupled to said beam directing means for alternately changing the direction of beam propagation between at least a pair of said directionally spaced beams at a second rate of alternation which is half that of said first rate of alternation, and means operated by said difference frequency signals at said second rate of alternation for controlling the direction of said radiated beams.

2. A frequency and drift angle tracker for a Doppler system wherein a plurality of energy beams are directed toward a target and speed and drift information is derived from the reflected echo signals comprising, means for directing a plurality of directionally spaced beams toward said target, means for receiving echo signals therefrom, means for alternately producing a pair of modulating signals having frequencies differing by a selected ratio at a first selected rate of alternation, means for modulating said echo signals by said alternately produced modulation signals to produce a pair of difference frequency signals, means for controlling the frequencies of said modulation signals by the time average of said difference frequency signals, means coupled to said beam directing means for alternately changing the direction of beam propagation between at least a pair of said directionally spaced beams at a second rate of alternation which is half that of said first rate of alternation, and means operated by said difference frequency signals at said second rate of alternation but displaced 90 electrical degrees with respect thereto for controlling the direction of said radiated beams.

3. A frequency and drift angle tracker for an aircraft Doppler navigation system wherein a plurality of microwave energy beams are directed towards the earth's surface and speed and drift information is derived from the reflected echo signals comprising, antenna means for directing a plurality of directionally spaced beams towards the earth's surface, at least a pair of which are directed towards areas located on opposite sides of the ground track of said aircraft, means for alternately producing a pair of modulating signals having frequencies differing by a selected ratio at a first selected rate of alternation, means for modulating said echo signals by said alternately produced modulation signals to produce alternately one or the other of a pair of difference frequency signals, means for controlling the frequencies of said modulation signals by the time average of said difference frequency signals, switch means coupled to said antenna means operated at a second rate which is half that of said first rate of alternation for energizing said antenna means and alternately radiating beams therefrom on opposite sides of the ground track of said aircraft at said second rate, and means having said difference signals impressed thereon at said second rate but delayed by 90 electrical degrees with respect thereto for controlling the direction of said beams relative to said ground track.

4. A frequency and drift angle tracker for an aircraft Doppler navigation system wherein a plurality of microwave energy beams are directed towards the earth's surface and speed and drift information is derived from the echo signals comprising, antenna means for directing a plurality of directionally spaced beams towards the earth's surface, at least a pair of which are directed towards areas located on opposite sides of the ground track of said aircraft, means for alternately producing a pair of modulating signals having frequencies differing by a selected ratio at a first selected rate of alternation, means for modulating said echo signals by said alternately produced modulation signals to produce alternately one or the other of a pair of difference frequency signals, means for controlling the frequencies of said modulation signals by the time average of said difference frequency signals, switch means coupled to said antenna means operated at a second rate which is half that of said first rate of alternation for energizing said antenna means and alternately radiating beams therefrom to alternately illuminate areas of the earth's surface on opposite sides of the ground track of said aircraft at said second rate, motive means rotating said antenna means whereby the said alternately illuminated areas are relatively shifted as respects said aircraft ground track, switch means having said alternate difference signals impressed thereon, means alternately operating said switch means to one or the other conditions of operation at said second rate but delayed 90 electrical degrees with respect thereto, and means tending to operate said motive means in one direction in the one condition of operation of said switch operating means and tending to operate said motive means in the opposite direction in the other condition of operation of said switch operating means.

5. A frequency and drift angle tracker for an aircraft Doppler navigation system wherein a plurality of microwave energy beams are directed towards the earth's surface and speed and drift information is derived from the echo signals comprising, antenna means for directing a plurality of directionally spaced beams towards the earth's surface, at least a pair of which illuminate areas disposed on opposite sides of the ground track of said aircraft, a local oscillator, frequency divider means having the signal output of said local oscillator impressed thereon and producing therefrom in one condition of operation a first signal whose frequency is a selected fraction of the signal output frequency of said local oscillator and in another condition of operation a second signal whose frequency is a different selected fraction of said local oscillator output signal frequency, means for altering the conditions of operation of said frequency dividing means at a first selected rate whereby alternate first and second signals are produced thereby at said selected rate, a modulator having said echo signals and said alternate first and second signals impressed thereon producing therefrom alternate difference frequency signals, means for controlling the signal output frequency by the time average of said difference frequency signals, means coupled to said antenna means operated at a second rate which is half that of said first rate for causing said antenna means to alternately illuminate areas on opposite sides of the ground track of said aircraft at said second rate, and means having said alternate difference frequency signals impressed thereon at said second rate but delayed by 90 electrical degrees with respect thereto for controlling the relative displacement of said alternately illuminated areas with respect to said ground track.

6. A frequency and drift angle tracker for an aircraft Doppler navigation system wherein a plurality of microwave energy beams are directed towards the earth's surface and speed and drift information is derived from the echo signals comprising, antenna means for directing a plurality of directionally spaced beams towards the earth's surface, at least a pair of which illuminate areas disposed on opposite sides of the ground track of said aircraft, a local oscillator, frequency divider means having the signal output of said local oscillator impressed thereon and producing therefrom in one condition of operation a first signal whose frequency is a selected fraction of the signal output frequency of said local oscillator and in another condition of operation a second signal whose frequency is a different selected fraction of said local oscillator output signal frequency, means for altering the conditions of operation of said frequency dividing means at a first selected rate whereby alternate first and second signals are produced thereby at said selected rate, a modulator having said echo signals and said alternate first and second signals impressed thereon producing therefrom alternate difference frequency signals, means for controlling the signal output frequency by the time average of said difference frequency signals, switch means coupled to said antenna means operated at a second rate which is half that of said first rate for causing said antenna means to alternately illuminate areas on opposite sides of the ground track of said aircraft at said second rate, motive means rotating said antenna means whereby said alternately illuminated areas are relatively shifted as respects said aircraft ground track, means alternately operating said switch means to one or the other condition of operation at said second rate but delayed 90 electrical degrees with respect thereto, and means tending to operate said motive means in one direction in the one condition of operation of said switch operating means and tending to operate said motive means in the opposite direction in the other condition of operation of said switch operating means.

7. A frequency and drift angle tracker for an aircraft Doppler navigation system wherein a plurality of microwave energy beams are directed toward the earth's surface and speed and drift information is derived from the echo signals comprising, antenna means for directing a plurality of directionally spaced beams toward the earth's surface, at least a pair of which illuminate areas disposed on opposite sides of the ground track of said aircraft, a local oscillator, frequency dividing means having first and second conditions of operation and having impressed thereon the signal output of said local oscillator, said frequency dividing means in its first condition of operation producing a first signal whose frequency is a selected fraction of the signal output of said local oscillator and in its second condition of operation producing a second signal whose frequency is a different selected fraction of said local oscillator output signal frequency, means for alternately operating said frequency dividing means in its first and second conditions of operation at a first selected rate whereby first and second signals are alternately produced at said selected rate, a modulator having said echo signals and said alternate first and second signals impressed thereon producing therefrom alternate difference frequency signals, means for phase detecting said difference signals at said first selected rate, means for integrating said phase detected signals, means for controlling the signal output frequency of said local oscillator by said integrated signals, means coupled to said antenna means operated at a second rate which is half that of said first rate for causing said antenna to alternately illuminate areas on opposite sides of said ground track at said second rate, and means having said alternate difference signals impressed thereon at said second rate but delayed 90 electrical degrees with respect thereto for controlling the relative displacement of said alternately illuminated areas with respect to said ground track.

8. A frequency and drift angle tracker for an aircraft Doppler navigation system wherein a plurality of microwave energy beams are directed toward the earth's surface and speed and drift information is derived from the echo signals comprising, antenna means for directing a plurality of directionally spaced beams toward the earth's surface, at least a pair of which illuminate areas disposed on opposite sides of the ground track of said aircraft, a local oscillator, frequency dividing means having first and second conditions of operation and having impressed thereon the signal output of said local oscillator, said frequency dividing means in its first condition of operation producing a first signal whose frequency is a selected fraction of the signal output of said local oscillator and in its second condition of operation producing a second signal whose frequency is a different selected fraction of said local oscillator output signal frequency, means for alternately operating said frequency dividing means in its first and second conditions of operation at a first selected rate whereby first and second signals are alternately produced at said selected rate, a modulator having said echo signals and said alternate first and second signals impressed thereon producing therefrom alternate difference frequency signals, means for phase detecting said difference signals at said first selected rate, means for integrating said phase detected signals, means for controlling the signal output frequency of said local oscillator by said integrated signals, switch means coupled to said antenna means operated at a second rate which is half that of said first rate for causing said antenna means to alternately illuminate areas on opposite sides of the ground track of said aircraft at said second rate, motive means rotating said antenna means whereby said alternately illuminated areas are shifted as respects said aircraft ground track, means alternatively operating said switch means to one or the other condition of operation at said second rate but delayed 90 electrical degrees with respect thereto, and means tending to operate said motive means in one direction in the one condition of operation of said switch operating means and tending to operate said motive means in the opposite direction in the other condition of operation of said switch operating means.

9. A speed and drift angle tracker for an aircraft Doppler navigation system wherein a plurality of microwave energy beams are directed toward the earth's surface and speed and drift information is derived from the echo signals comprising, antenna means directing a plurality of beams toward the earth's surface to form specially separated illuminated areas thereon at least two of said separate areas of which are disposed on opposite sides of the ground track of said aircraft as respects each other, a local oscillator, a two-state frequency divider means having the output of said local oscillator impressed thereon, said frequency divider means in its first state being operative to reduce the frequency of said local oscillator output signal to a first selected fraction and in its second state operative to reduce the frequency of said local oscillator signal to a second different selected fraction, means for generating a first alternating signal having a selected frequency, means for alternately operating said frequency divider means to its first and second states in accordance with the alternations of said first alternating signal, means for mixing the received echo signals and the alternating outputs of said frequency divider means to produce alternate first and second difference signals, means controlling the output signal frequency of said local oscillator by the time average of said first and second difference frequency signals, antenna switch means switching said antenna means to alternately illuminate areas on opposite sides of said ground track, means for generating a second alternating signal having a frequency half that of the frequency of said first alternating signal, means operating said antenna switch means by said second alternating signal, a motor for positioning said antenna means, means for generating a third alternating signal having a frequency equal to that of said second alternating signal but delayed 90° with respect thereto, means operated by said third alternating signal for phase detecting said first and second difference signals, and means for energizing said motor by said phase detected signals.

No references cited.